(12) United States Patent
Garrett

(10) Patent No.: US 8,286,567 B2
(45) Date of Patent: Oct. 16, 2012

(54) SEED PLANTING DEVICE

(76) Inventor: Terry N. Garrett, Athens, TN (US)

(*) Notice: Subject to any disclaimer, the term of this patent is extended or adjusted under 35 U.S.C. 154(b) by 0 days.

(21) Appl. No.: 12/062,168

(22) Filed: Apr. 3, 2008

(65) Prior Publication Data

US 2009/0249989 A1    Oct. 8, 2009

(51) Int. Cl.
*A01C 5/00* (2006.01)
*A01C 5/02* (2006.01)
*A01C 15/00* (2006.01)

(52) U.S. Cl. .............................. 111/200; 111/92; 111/99

(58) Field of Classification Search ................... 446/120, 446/108, 124; 111/106, 200, 900, 89, 92, 111/99
See application file for complete search history.

(56) References Cited

U.S. PATENT DOCUMENTS

| 4,261,270 A * | 4/1981 | Nichols | 111/89 |
| 4,676,762 A * | 6/1987 | Ballard | 446/104 |
| 5,145,441 A * | 9/1992 | Hsun | 446/126 |
| 2006/0030234 A1* | 2/2006 | Stiber et al. | 446/124 |

* cited by examiner

*Primary Examiner* — Christopher J. Novosad
(74) *Attorney, Agent, or Firm* — Pitts & Lake, P.C.

(57) ABSTRACT

A seed planting device. The seed planting device includes an elongated member defining a plurality of shallow depressions regularly spaced along one or more of the member's faces. Each depression defines a volume capable of receiving a seed. A practitioner uses one face or edge of the device to create an indentation in the soil. The practitioner then lifts the device and tilts it so that the seeds fall out of the shallow depressions into the indentation. The practitioner then covers the seeds with soil by filling in the indentation with loose earth or potting soil.

2 Claims, 5 Drawing Sheets

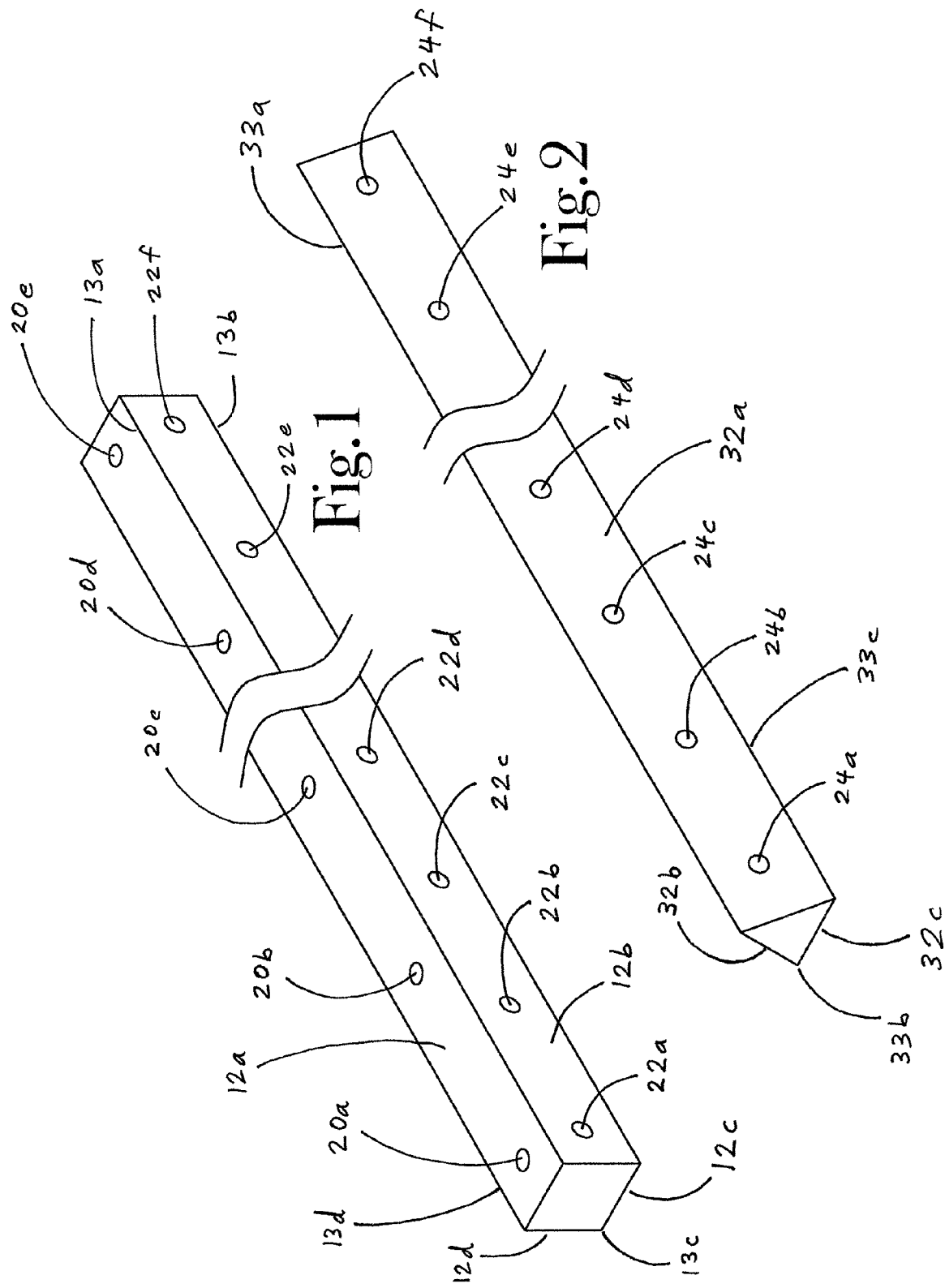

SEED PLANTING DEVICE

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

The present invention relates generally to a device for planting seeds. More particularly, the invention is directed toward a hand-held device for simultaneously planting a number of seeds at regularly spaced intervals.

2. Description of the Related Art

Farmers and gardeners are aware that it is often necessary to ensure that seeds are planted in an orderly manner with regular spacing between each planted seed. As the seeds develop into plants and the plants grow, a certain minimal space between the planting sites of neighboring seeds helps to ensure that the root systems of neighboring plants do not become excessively interconnected; that each growing plant has uncompromised and exclusive access to the nutrients in its own area of soil or growth media; and that no plant's foliage blocks a neighboring plant's access to sunlight.

In the field of large scale farming, mechanized planters have long been known and used to ensure the desired minimal distance between planted seeds. However, in the field of small scale gardening, there exists a long-felt need for an inexpensive, user-friendly device for ensuring the desired minimal distance between planted seeds. Such a device would also hopefully allow a practitioner to plant seeds quickly and to ensure that the practitioner was making optimal and efficient use to space. The optimal and efficient use to space is especially important in such situations as growing foodstuff plants in a planter; in such a situation, the practitioner has need of a way both to ensure the desired minimal distance between planted seeds and to plant as many seeds as possible in the designated space. Thus, the needed device should ensure the minimal distance between planted seeds while simultaneously preventing the practitioner from having more space between planted seeds than is necessary. Further, because of the different properties of varying plant species, the optimal distance between planted seeds may differ with each plant species.

BRIEF SUMMARY OF THE INVENTION

A seed planting device is disclosed. The seed planting device includes a rod defining a number of shallow depressions regularly spaced along one or more of the rod's faces. Each depression defines a volume capable of receiving a seed. A practitioner uses one edge of the rod to create a narrow indentation or furrow in the soil. The practitioner then lifts the rod and tilts it so that the seeds fall out of the shallow depressions into the indentation. The practitioner then covers the seeds with soil by filling in the indentation with loose earth or potting soil.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is a perspective view of one embodiment of the seed planting device, said embodiment having four longitudinal faces;

FIG. 2 is a perspective view of another embodiment of the seed planting device, said embodiment having three longitudinal faces;

DETAILED DESCRIPTION OF THE INVENTION

A seed planting device of the present invention is shown generally at 10 in FIG. 1. This device 10 is elongated and in an illustrated embodiment is square in cross-sectional outline. The device defines four longitudinal faces, 12*a*, 12*b*, 12*c* and 12*d*, which extend along the length of the device. This length is approximately 36 inches in the preferred embodiment, although the length can vary as necessary or desired. The length is chosen such that the device can easily be manipulated, but long enough to assure that multiple seeds can be planted at one time, thus reducing the time necessary to plant a row. The adjacent longitudinal faces 12*a*, 12*b*, 12*c* and 12*d* form edges 13*a*, 13*b*, 13*c*, and 13*d* respectively. These edges 13*a*-*d* can be used to form an indentation or furrow in the dirt as will be described in greater detail hereinafter.

Figure 6:
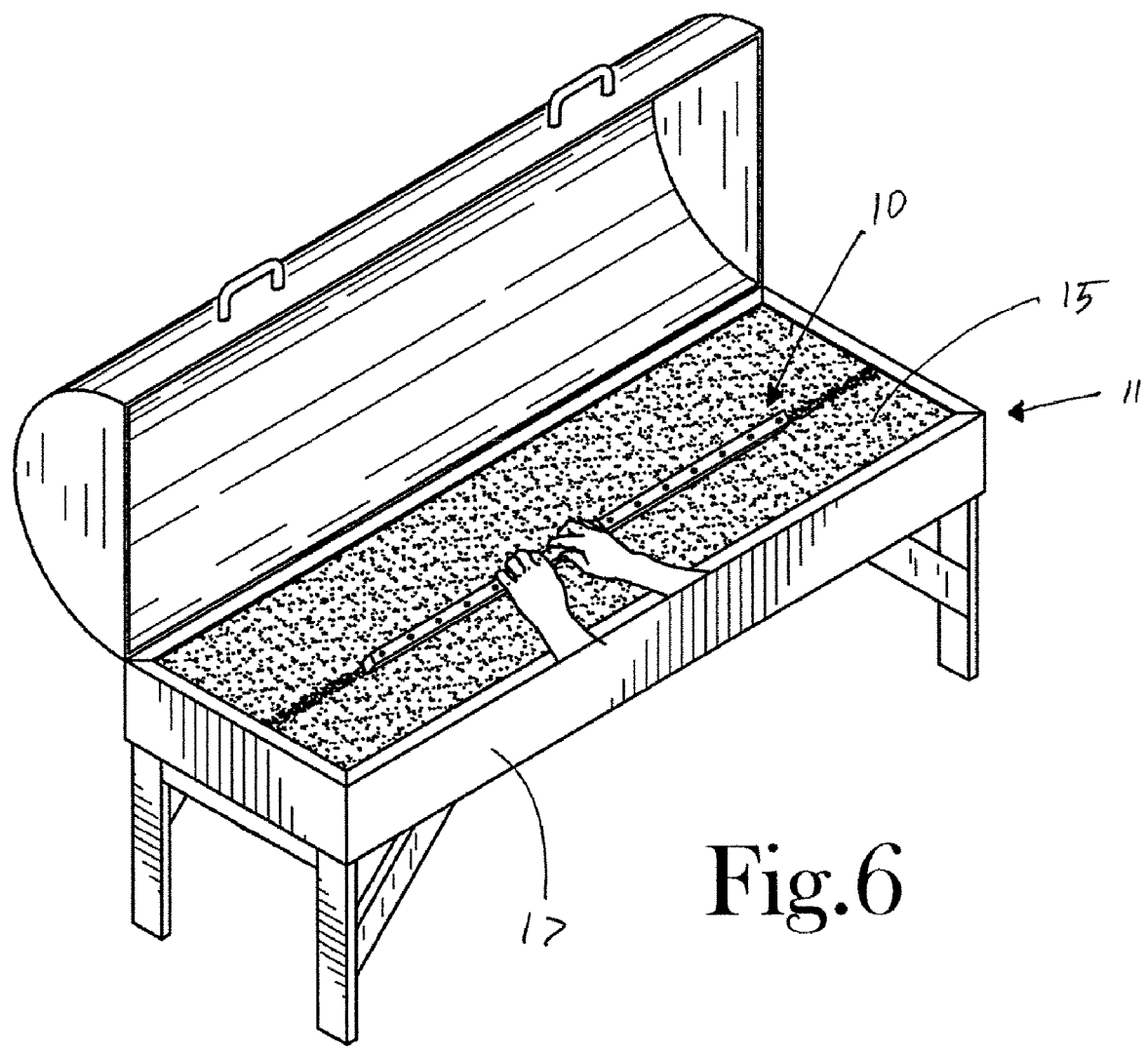
FIG. 6 is a perspective view showing the use of the device in a planter.

The device can be used in a regular garden and finds particular application in a planter 11 of the type shown in FIG. 6 which includes a dirt-laden container 15 that is elevated above the ground on a support structure 17. The height of the container or trough 15 is sufficient for a handicapped person in a wheelchair to roll his or her lap under the planter and tend to a planter garden.

As shown in FIG. 1 a plurality of shallow holes or depressions 20*a*-*e* are defined in at least one side of the device 10 and open on face 12*a*. The depressions can be drilled into the device or can be fabricated therein if the device is manufactured from plastic. The depressions 20*a*-*e* are sized to receive various types of seeds at spaced locations along the length of the device face. Each of the depressions 20*a*-*e* is large and deep enough to contain a substantial portion of a seed. The spacing between depressions is chosen depending on the particular seed that is to be planted. For example: carrot seeds are planted 3-4 inches apart, and thus the holes are spaced by that amount; radish seeds are spaced between 1½ to 2 inches; beets are usually spaced approximately 4 inches; peas and beans are spaced approximately 4-5 inches apart. Similarly the holes are sized to receive seed. It will be noted in FIG. 1 that alternate holes can be used for receiving seeds as is necessary where a greater spacing is desired between the planted seeds.

In the embodiment shown in FIG. 1, spaced depressions are also defined in the face 12*b*. It will be noted that these depressions 22a-f are spaced lesser distances than the depressions 20a-e shown in the face 12a. The presence of two sets of depressions of the same device allows the device to be used for planting different types of seeds, since as explained above some plant species require greater or lesser space between seeds than other plant species. Thus, the presence of two sets of apertures on the same device allows the same device to handle a greater variety of seeds. It will be recognized that, just as the length of the device can vary as necessary or desired, so too the total number of depressions can vary, based upon the length of the device and the desires space between depressions. In the preferred embodiment the depressions are approximately 0.25 inches in diameter and approximately 0.25 inches deep. It has been found that these depressions will accommodate most garden seeds.

One embodiment 30 of the present invention shown in FIG. 2 defines three longitudinal faces 32a, 32b and 32c, which extend along the length of the device. Accordingly, this embodiment of the device is generally triangular in cross-sectional outline. The adjacent longitudinal faces 32a, 32b and 32c form edges 33a, 33b, and 33c, respectively. As the embodiment 30 is triangular in cross-sectional outline, whereas the embodiment 10 was square in cross-sectional outline, the adjacent faces 32a, 32b and 32c in the device 30 meet at more acute angles than the faces 12a, 12b, 12c and 12d in the device 10. Thus, the edges 33a, 33b, and 33c are sharper than the edges 13a, 13b, and 13c, and the edges 33a, 33b, and 33c on the device 30 can more easily form deeper indentations or furrows than the edges 13a, 13b, and 13c on the device 10, if a deeper setting for a given type of seed is desired. In the preferred embodiment of the triangular cross-sectional device 30 shown in FIG. 2, the depressions are approximately 0.4-0.5 inches in diameter and about 0.3-0.4 inches deep. The spacing between adjacent depressions will preferably be about 3 inches, which will allow planting of seeds at 3-inch, 6-inch, or 9-inch intervals, depending upon whether every depression, every other depression or every third depression is used for the particular variety of seed to be planted.

Figure 3:
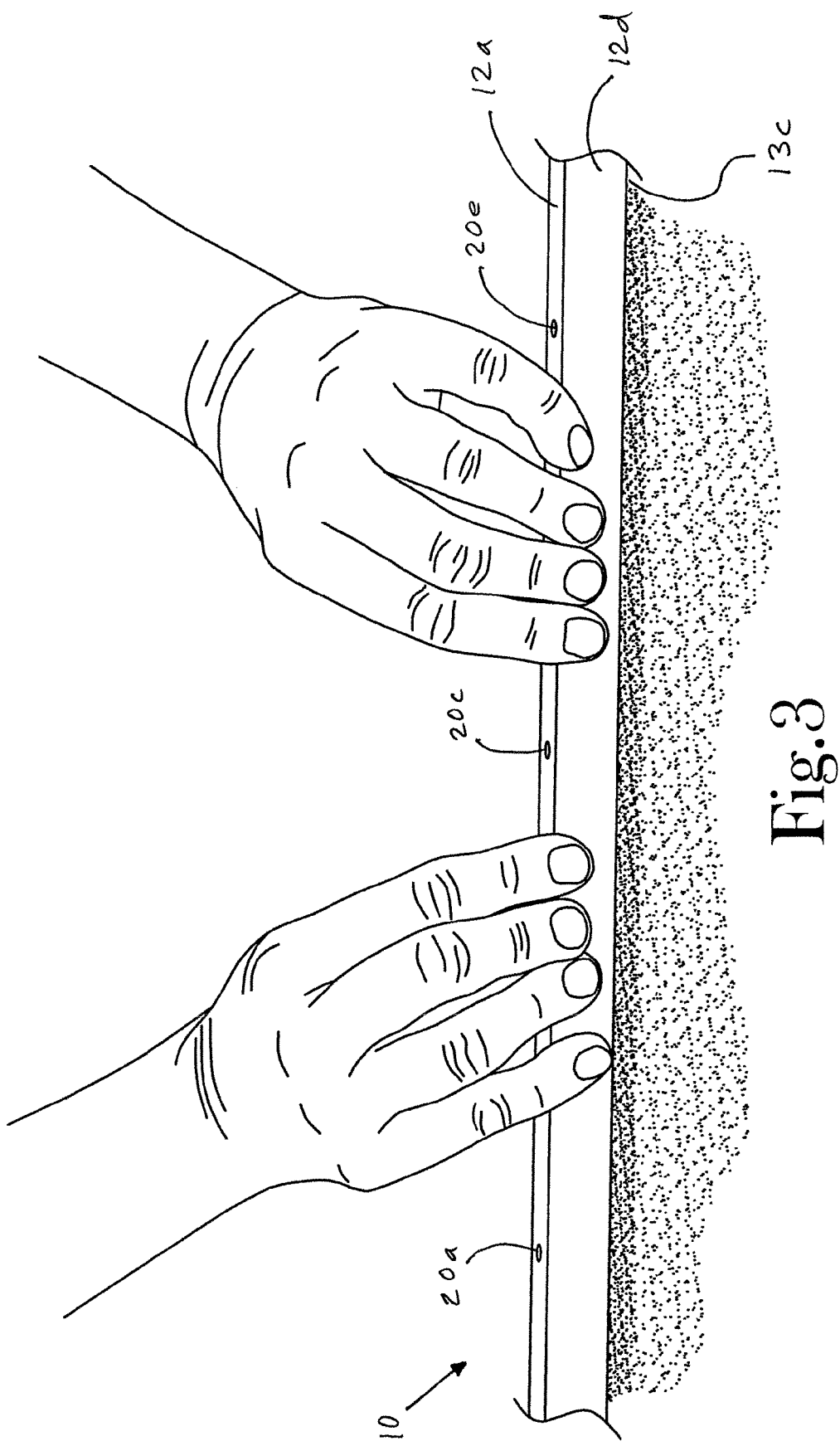
FIG. 3 is a view of a practitioner using an embodiment of the device to create an indentation or furrow in the earth for receiving seeds at spaced localities.
Figure 4:
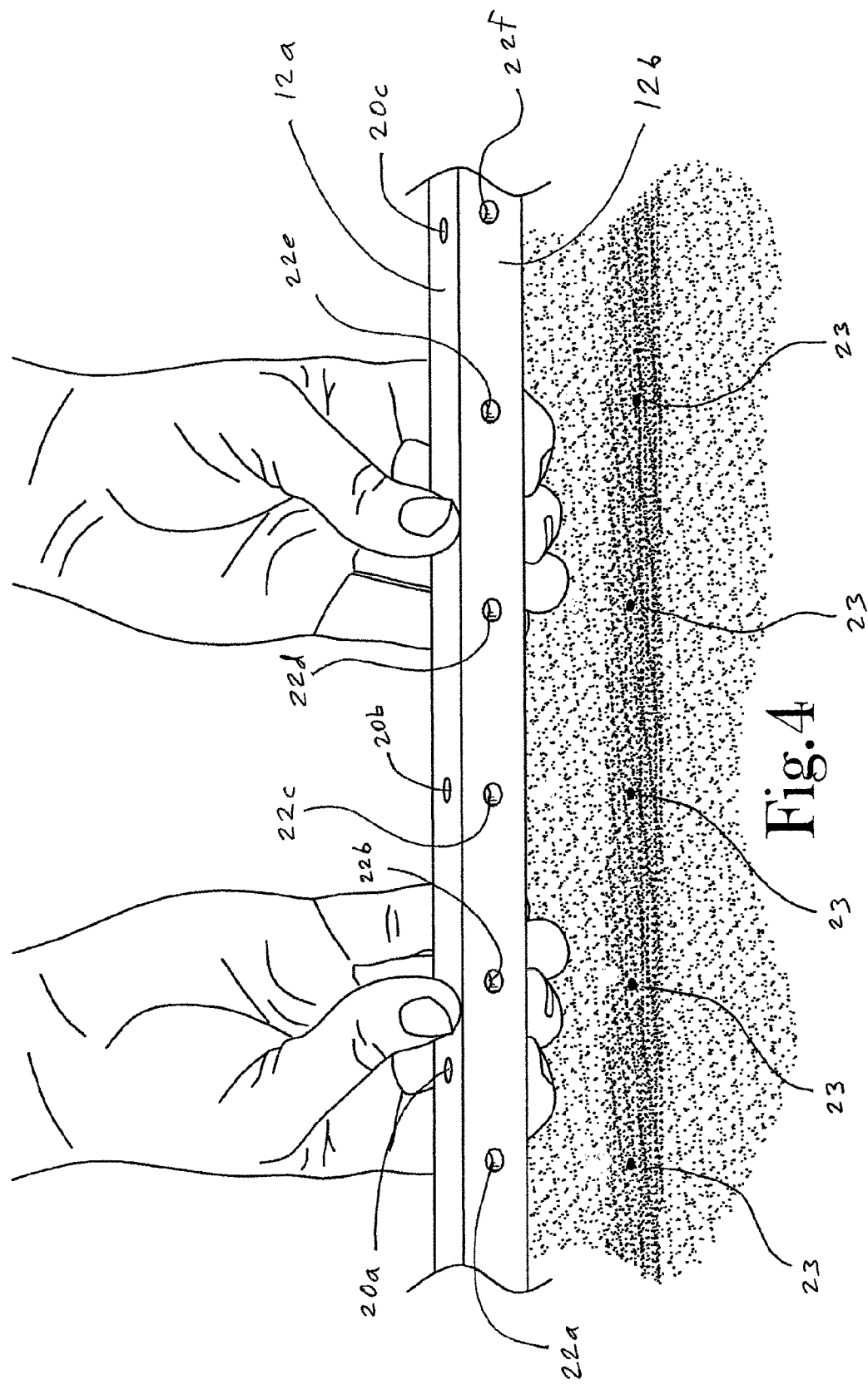
FIG. 4 is a view of a practitioner tilting an embodiment of the device to cause seeds to fall into the indentation in the earth.
Figure 5:
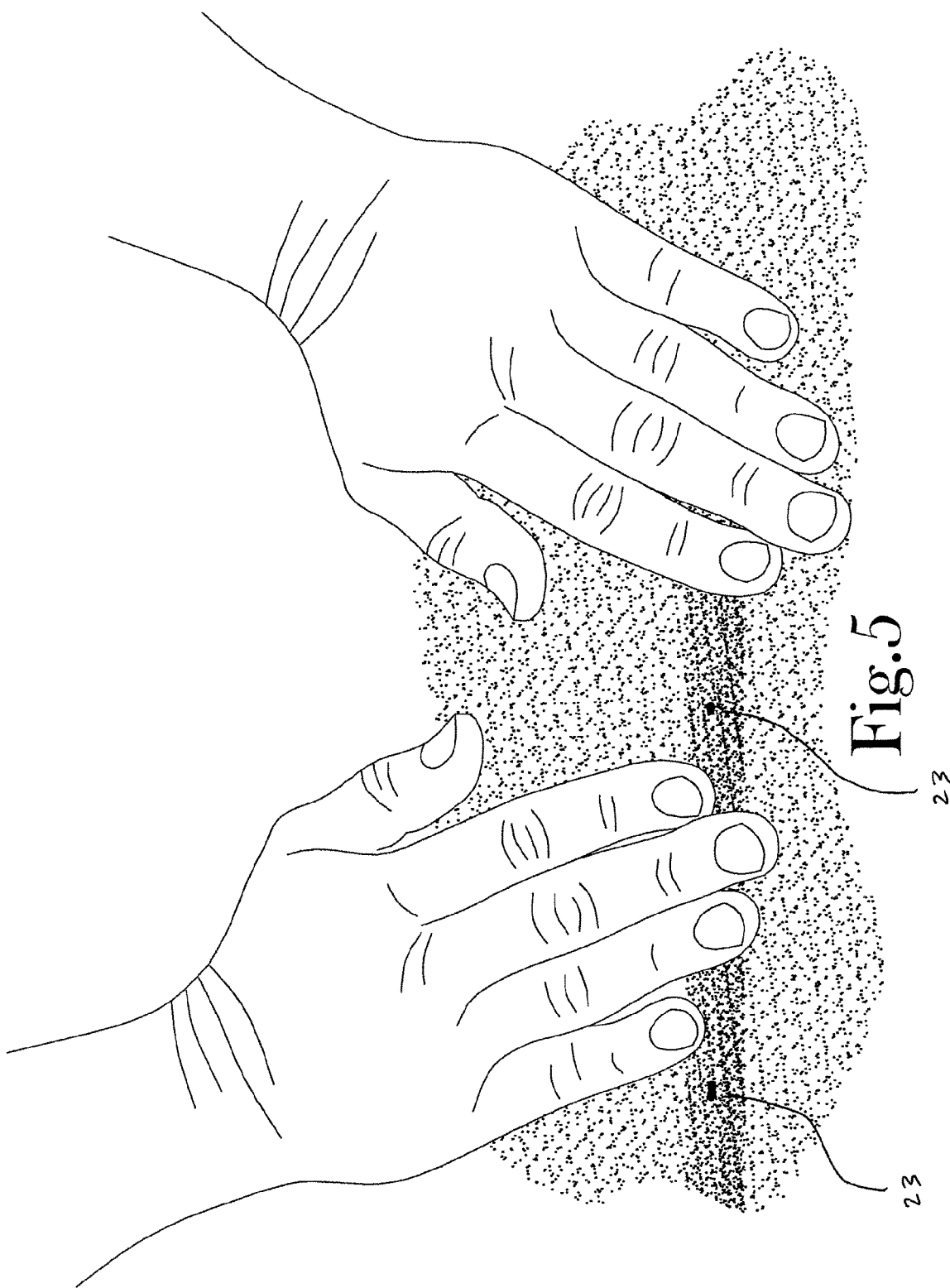
FIG. 5 is a view of a practitioner manually covering planted deposited seeds with loose soil.

As shown in FIG. 3, a practitioner creates a narrow and shallow indentation or furrow in the soil by pressing the edge 13b of the device 10 into the soil. Then, as shown in FIG. 4, the practitioner rotates the device 10 so that the depressions 22a-f are oriented in the general direction of the previously formed indentation to allow the seeds 23 in the depressions 22a-f to fall into the furrow. If necessary, the practitioner then shakes the device 10, causing the seeds 23 stored in the depression 22a-f to fall into the furrow. The practitioner then covers the seeds 23 by filling in the indentation with loose earth, potting soil, or a similar substance, as shown in FIG. 5.

While the present invention has been illustrated by description of one embodiment, and while the illustrative embodiment has been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A method for planting seeds in soil comprising:
    supplying an elongated rod having at least three longitudinal faces, at least one said longitudinal face defining a plurality of regularly spaced seed receptacles, the distance between adjacent seed receptacles being between one inch and five inches, at least two said longitudinal faces meeting to define an edge;
    filling with seeds at least two of said seed receptacles on one of said faces;
    pressing said edge into the soil to form a furrow in the soil; and
    rotating said rod so that said seed receptacles are oriented in the general direction of the furrow, whereby the seeds in said seed receptacles fall into the furrow at approximately regularly spaced intervals.

2. A method for planting seeds for use in a physical therapy regimen for persons with compromised bodily mobility or impaired muscular control, said method comprising:
    supplying an elongated member defining a plurality of regularly spaced seed receptacles along a longitudinal axis of said elongated member, the distance between adjacent seed receptacles being between one inch and five inches, said elongated member further defining an edge for creating a furrow in soil;
    filling at least two of said seed receptacles with seeds;
    moving said elongated member into a first position such that said edge forms a furrow in the soil; and
    moving said elongated member into a second position such that said seed receptacles are positioned substantially above the furrow and said seed receptacles are oriented so that seeds fall from said seed receptacles by force of gravity, whereby the seeds in said seed receptacles fall into the furrow at approximately regularly spaced intervals.

* * * * *